(12) United States Patent  
Lim et al.

(10) Patent No.: US 11,144,249 B2  
(45) Date of Patent: Oct. 12, 2021

(54) STORAGE SYSTEM INCLUDING NONVOLATILE MEMORY MODULE FOR CONVERTING RANDOM LOGICAL ADDRESSES TO SEQUENTIAL LOGICAL ADDRESSES AND OPERATING METHOD OF THE NONVOLATILE MEMORY MODULE

(71) Applicant: Samsung Electronics Co., Ltd., Suwon-si (KR)

(72) Inventors: Seung-Woo Lim, Hwaseong-si (KR); Kyu-Min Park, Suwon-si (KR); Do-Han Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/814,281

(22) Filed: Mar. 10, 2020

(65) Prior Publication Data

US 2021/0026567 A1    Jan. 28, 2021

(30) Foreign Application Priority Data

Jul. 26, 2019 (KR) ........................ 10-2019-0090959

(51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0656* (2013.01); (Continued)

(58) Field of Classification Search
CPC .... G06F 3/0659; G06F 3/0604; G06F 3/0656; G06F 12/10; G06F 3/0679; G06F 2212/657; G06F 3/064; G06F 3/061; G06F 2212/7204; G06F 2212/7205; G06F 2212/1016; G06F 12/0246; G06F 2212/7201; G06F 2212/7203; G06F 2212/7208

(Continued)

(56) References Cited

U.S. PATENT DOCUMENTS 9,697,116 B2    7/2017  Kim et al.
2012/0254524 A1  10/2012  Fujimoto
(Continued)

FOREIGN PATENT DOCUMENTS

KR    10-0258561 B1    6/2000

*Primary Examiner* — Hong C Kim
(74) *Attorney, Agent, or Firm* — Harness, Dickey & Pierce, P.L.C.

(57) ABSTRACT

A storage system includes a processor configured to request a write operation of first data corresponding to a first logical address, and requests a write operation of second data corresponding to a second logical address, a memory module including a nonvolatile memory device configured to store the first data and the second data, and a controller configured to convert the first logical address into a first device logical address, and converts the second logical address into a second device logical address based on the first device logical address and a size of the first data, and a storage device configured to store the first data in the storage device based on the first device logical address, and store the second data in the storage device based on the second device logical address.

20 Claims, 13 Drawing Sheets

(52) U.S. Cl.
CPC ............ G06F 3/0679 (2013.01); G06F 12/10 (2013.01); *G06F 2212/657* (2013.01)

(58) Field of Classification Search
USPC ......................................... 711/217, 206, 103
See application file for complete search history.

(56) References Cited

U.S. PATENT DOCUMENTS

| | | | |
|---|---|---|---|
| 2015/0046670 A1* | 2/2015 | Kim | .................. G06F 11/1471 |
| | | | 711/207 |
| 2018/0018101 A1 | 1/2018 | Benisty et al. | |
| 2018/0081591 A1 | 3/2018 | Maheshwari et al. | |
| 2018/0329818 A1 | 11/2018 | Cheng et al. | |
| 2018/0335943 A1* | 11/2018 | Ji | ............................ G06F 3/065 |
| 2019/0004949 A1 | 1/2019 | Kim et al. | |
| 2019/0095348 A1 | 3/2019 | Peng et al. | |

* cited by examiner

STORAGE SYSTEM INCLUDING NONVOLATILE MEMORY MODULE FOR CONVERTING RANDOM LOGICAL ADDRESSES TO SEQUENTIAL LOGICAL ADDRESSES AND OPERATING METHOD OF THE NONVOLATILE MEMORY MODULE

CROSS-REFERENCE TO RELATED APPLICATIONS

This application claims priority under 35 U.S.C. § 119 to Korean Patent Application No. 10-2019-0090959 filed on Jul. 26, 2019, in the Korean Intellectual Property Office, the disclosure of which is incorporated by reference herein in its entirety.

BACKGROUND

Example embodiments of the inventive concepts described herein relate to a semiconductor memory, and more particularly, relate to a storage system including a nonvolatile memory module and an operating method of the nonvolatile memory module.

As an electronic device is widely distributed and various types of information are conveyed, data diversifies in kind, and the amount of data is sharply increasing. For this reason, there is an increasing demand on a storage device that is able to store a large amount of data with reliability and to process a large amount of data with high performance. A solid state drive that is based on a flash memory device is on the spotlight as a high-capacity storage medium.

In the case where a plurality of data bits are stored in a semiconductor memory element on the small circuit area, it is advantageous to store a large amount of data. As such, a flash memory device that is able to store a plurality of bits per memory cell is on the rise. However, as charge leakage of the semiconductor memory element increases and a voltage margin for data determination decreases, the reliability of data falls. In a process for increasing this reliability, a write speed of the storage device may decrease. In particular, the write speed may markedly decrease in a random write operation. There is a demand on improving the decrease of performance of the storage device.

SUMMARY

Some example embodiments of the inventive concepts provide a storage system including a nonvolatile memory module improving write performance of a storage device and an operating method of the nonvolatile memory module.

According to some example embodiments, a storage system includes a configured to request a write operation of first data corresponding to a first logical address, and request a write operation of second data corresponding to a second logical address, a memory module including a nonvolatile memory device configured to store the first data and the second data, and a controller configured to cause the memory module to convert the first logical address into a first device logical address, and convert the second logical address into a second device logical address based on the first device logical address and a size of the first data, and a storage device configured to store the first data in the storage device based on the first device logical address, and store the second data in the storage device based on the second device logical address.

According to some example embodiments, an operating method of a nonvolatile memory module, the nonvolatile memory module included in a host controlling a storage device, includes, receiving a write request for first data corresponding to a first logical address, allocating a write buffer area of a given size to a memory device in response to the write request for the first data, converting the first logical address into a first device logical address, writing the first data in the write buffer area, receiving a write request for second data corresponding to a second logical address, converting the second logical address into a second device logical address based on the first device logical address and a size of the first data, and writing at least a portion of the second data in the write buffer area.

According to some example embodiments, a storage system includes a host including, a processor configured to cause the host to generate a first logical address corresponding to first data and a second logical address corresponding to second data, and a controller configured to convert the first logical address into a first device logical address and convert the second logical address into a second device logical address based on the first device logical address and a size of the first data, and a storage device including a nonvolatile memory device, and a storage controller configured to cause the storage device to store the first data in the nonvolatile memory device based on the first device logical address and store the second data in the nonvolatile memory device based on the second device logical address.

BRIEF DESCRIPTION OF THE FIGURES

The above and other objects and features of the inventive concepts will become apparent by describing in detail some example embodiments thereof with reference to the accompanying drawings.

DETAILED DESCRIPTION

Below, some example embodiments of the present inventive concepts will be described in detail with reference to the accompanying drawings.

Figure 1:
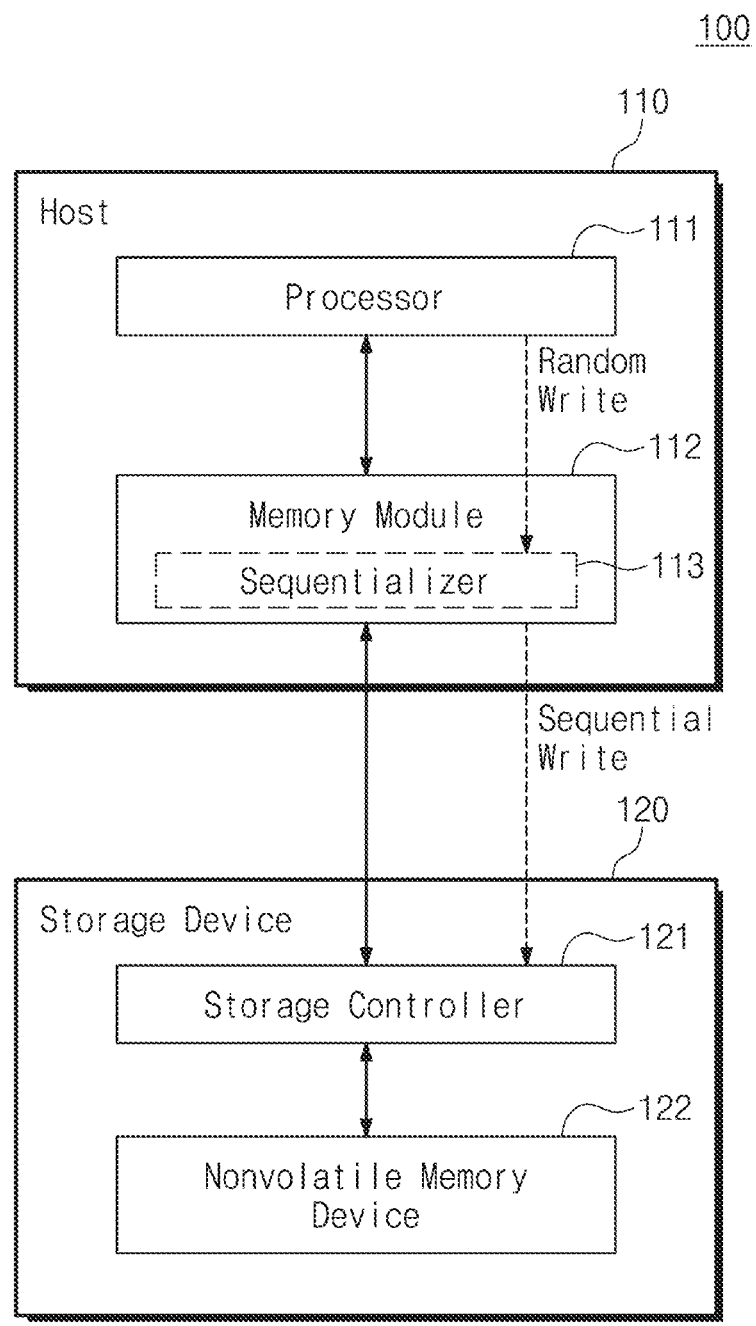
FIG. 1 is a block diagram of a storage device according to some example embodiments of the inventive concepts.

FIG. 1 is a block diagram of a storage device according to some example embodiments of the inventive concepts. Referring to FIG. 1, a storage system 100 may include a host 110 and a storage device 120. For example, the storage system 100 may include one of various storage systems such as a personal computer, a notebook, a server, a workstation, a smartphone, and a tablet.

The host 110 may be configured to control the storage device 120. The host 110 may be understood as an object that is able to access the storage device 120. For example, the host 110 may store data in the storage device 120 or may read data stored in the storage device 120. The host 110 may include a processor 111 and a memory module 112.

The processor 111 may control overall operations of the storage system 100 and may perform various arithmetic/logical operations. For example, the processor 111 may be implemented with a general-purpose processor, a special-purpose processor, or an application processor, which includes one or more processor cores. The processor 111 may provide the memory module 112 with a request that allows the storage device 120 to write data, to read data, or to erase data stored in the storage device 120.

The memory module 112 may manage data and a logical address (e.g., a logical block address LBA) that are transferred to the storage device 120. The memory module 112 may receive a write request from the processor 111. In this case, write data and a logical address may be transferred to the memory module 112 together with the write request. The memory module 112 may store write data and may output the stored write data to the storage device 120. That is, the memory module 112 may operate as a buffer memory in a write operation.

The memory module 112 may be a nonvolatile memory module including at least one nonvolatile memory device. For example, the memory module 112 may be implemented with a nonvolatile dual in-line memory module (NVDIMM). Because the memory module 112 has a higher write speed than the storage device 120 such as an SSD and retains data stored therein even when a power is not supplied, the NVDIMM may be used as the memory module 112 for storing write data.

A sequentializer 113 may be implemented in the memory module 112. The sequentializer 113 may be implemented with hardware in the memory module 112 or may be implemented with a software block, for example, in the form of firmware. The sequentializer 113 may convert a random write operation requested by the processor 111 into a sequential write operation. To this end, the sequentializer 113 may convert a random logical address into a sequential logical address in a write operation requested by the processor 111. In the storage device 120, because a speed of the sequential write operation is higher than that of the random write operation, the performance of the storage device 120 may be improved. This operation will be more fully described later.

The storage device 120 may be configured to operate under control of the host 110. The storage device 120 may be a solid state drive (SSD). For example, the storage device 120 may include a storage controller 121 and a nonvolatile memory device 122.

The storage controller 121 may be configured to control the nonvolatile memory device 122. The storage controller 121 may write data in the nonvolatile memory device 122 in response to a write request from the host 110. The storage controller 121 may read data stored in the nonvolatile memory device 122 in response to a read request from the host 110. The storage controller 121 may erase data stored in the nonvolatile memory device 122 in response to an erase request from the host 110. To this end, the storage controller 121 may transmit an address, a command, and/or a control signal to the nonvolatile memory device 122.

The storage controller 121 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The storage controller 121 may perform a write operation, a read operation, and/or an erase operation on the nonvolatile memory device 122 based on a logical address converted by the sequentializer 113. Because a random logical address is converted into a sequential logical address by the sequentializer 113, the storage controller 121 may perform the sequential write operation on the nonvolatile memory device 122.

The storage controller 121 may drive a flash translation layer (FTL) for defining a correspondence relationship between sequentially converted logical addresses and physical addresses of the nonvolatile memory device 122. A physical address may indicate an actual location of a storage area of the nonvolatile memory device 122. The storage controller 121 may perform the write operation, the read operation, or the erase operation on the storage area that the physical address indicates.

The nonvolatile memory device 122 may be configured to store data and/or to output the stored data, under control of the storage controller 121. For example, the nonvolatile memory device 122 may be a NAND flash memory device, but the inventive concepts are not limited thereto.

The nonvolatile memory device 122 may include a memory cell array where data are stored. At least some of the memory cells included in the memory cell array may store a plurality of bits. For example, the memory cell array may include a triple level cell (TLC) or a quad-level cell (QLC). The TLC may store three bits, and the QLC may store four bits. Each of the TLC and the QLC may store a plurality of bits, but write speeds of the TLC and the QLC may be lower than a write speed of a single level cell (SLC). In particular, the random write speed may be lower than the sequential write speed. The storage system 100 according to some example embodiments of the inventive concepts may improve a write speed even though each of memory cells of the nonvolatile memory device 122 stores a plurality of bits.

Figure 2:
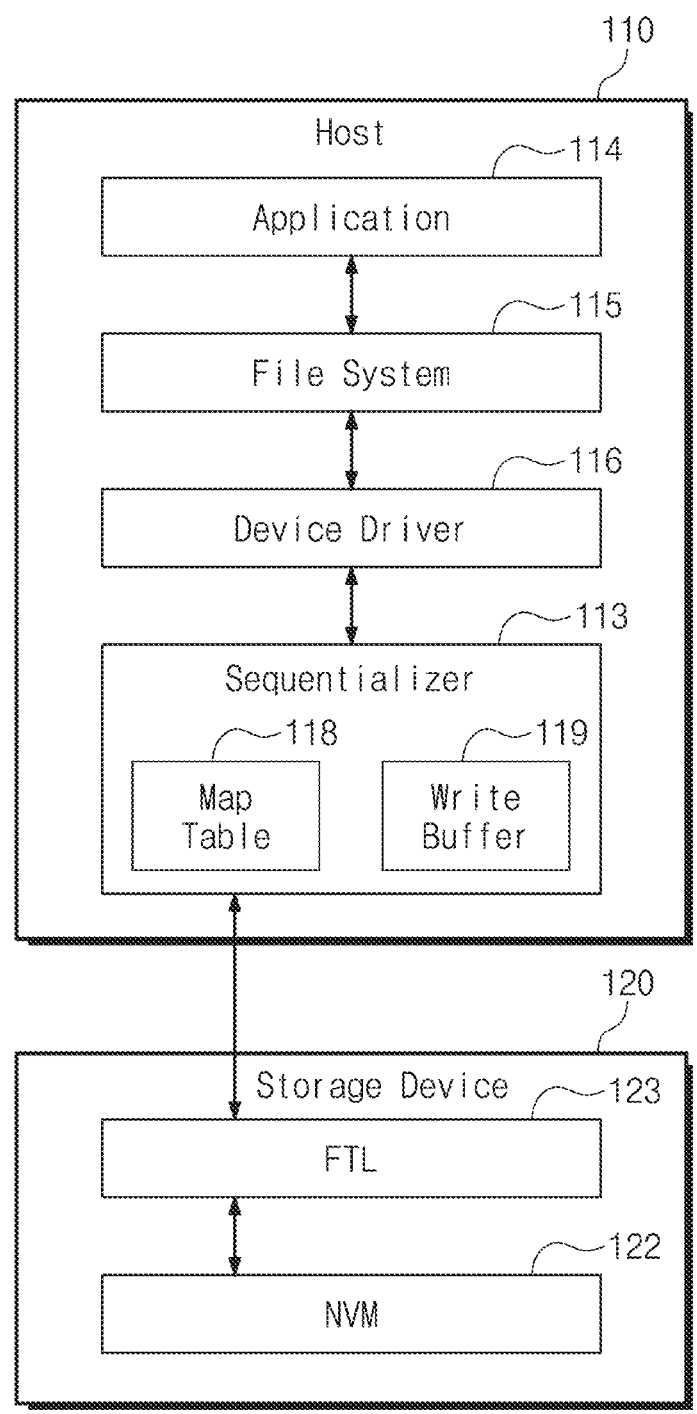
FIG. 2 is a block diagram illustrating software layers of a storage system of FIG. 1.

FIG. 2 is a block diagram illustrating software layers of a storage system of FIG. 1. Referring to FIG. 1, software layers of the host 110 may include an application 114, a file system 115, a device driver 116, and the sequentializer 113. For example, the application 114, the file system 115, and the device driver 116 may be driven by the processor 111 of FIG. 1. For example, the sequentializer 113 may be driven by the memory module 112 of FIG. 1.

The application 114 may refer to a variety of software that is driven on the host 110. The application 114 may mean user and system processes to exchange data with the storage device 120 (e.g., for data input/output).

The file system 115 may perform a role of organizing files or data that are used by the application 114. For example, the file system 115 may manage a storage space of the storage device 120 by using logical addresses. For example, the file system 115 may have a type that is variable with an operating system driven on the host 110. For example, the file system 115 may include one of various file systems such as FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, and WinFS.

The device driver 116 may perform an operation of translating information from the file system 115 into information that is recognizable by the storage device 120. The translated information may include a request for a write operation, a read operation, or an erase operation, a logical address, and data to be exchanged with the storage device 120. The device driver 116 may process a request for input/output with the storage device 120 and may be defined as a kernel together with the sequentializer 113.

The sequentializer 113 may convert a random logical address provided from the device driver 116 into a sequential logical address (hereinafter referred to as a "device logical address"). The sequentializer 113 may convert a logical address, which is provided together when receiving the write request, into the device logical address. The device logical address may be calculated based on a device logical address converted in a previous write request and a size of data provided in the previous write request. For example, the device logical address may be determined by adding a size of previous write data to a previous device logical address. This will be more fully described.

A map table 118 and a write buffer 119 may be provided by the sequentializer 113. The map table 118 may be used to convert the random logical address into the device logical address and may be used to manage data to be output to the storage device 120. In response to a write request, a new entry may be recorded at the map table 118. The sequentializer 113 may generate an entry with reference to the random logical address and data provided together with the write request. The entry may include the following information about a request from the application 114: a random logical address, a size of data, identification information of the write buffer 119, a device logical address, and flush information. The map table 118 and an entry recorded at the map table 118 will be more fully described later.

The write buffer 119 is configured to store data provided from the device driver 116 together with the write request. The sequentializer 113 may allocate the write buffer 119 to a memory device included in the memory module 112 of FIG. 1 in response to the write request. The sequentializer 113 may write data in the write buffer 119 based on a device logical address. Data may be sequentially written in the write buffer 119 in the order of being write requested. Because the write buffer 119 is provided by the memory module 112 including a nonvolatile memory device, data stored in the write buffer 119 may not be lost due to an unexpected event such as a sudden power-off.

When a size of data stored in the write buffer 119 is equal to or larger than a reference size, data may be flushed to the storage device 120 as much as the reference size. As such, data stored in the write buffer 119 may be transferred to the storage device 120 together with a device logical address.

The storage device 120 may include a flash translation layer 123 and the nonvolatile memory device 122. The flash translation layer 123 may be driven by the storage controller 121 of FIG. 1. The flash translation layer 123 may convert (or translate) a device logical address provided from the sequentializer 113 into a physical address. The flash translation layer 123 may manage a correspondence relationship between logical addresses and physical addresses in the form of a map table. Data may be written in a storage area of the nonvolatile memory device 122, which a physical address indicates. Besides, the flash translation layer 123 may perform maintenance operations of the storage device 120, such as a garbage collection operation, a read reclaim operation, a data recovery operation, and a data backup operation.

Figure 3:
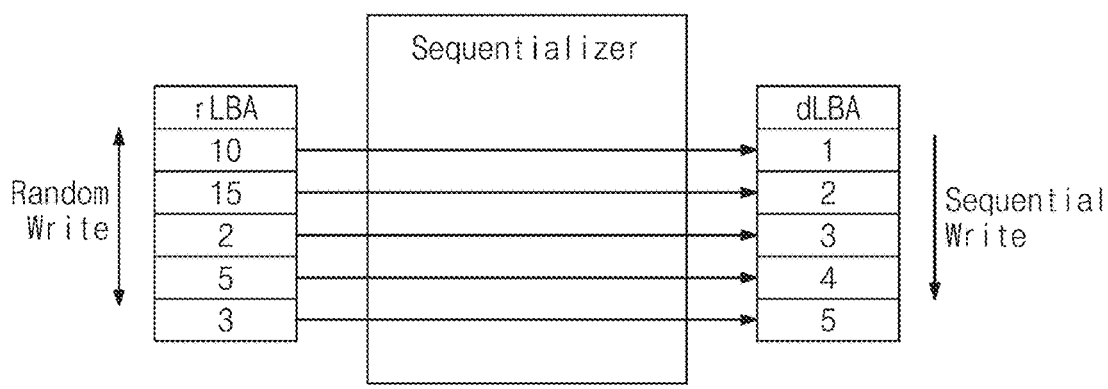
FIG. 3 is a conceptual diagram for briefly describing an operation of a sequentializer described with reference to FIGS. 1 and 2.

FIG. 3 is a conceptual diagram for briefly describing an operation of a sequentializer described with reference to FIGS. 1 and 2. Referring to FIG. 3, the sequentializer 113 may receive a random logical address rLBA together with a write request from the processor 111 of FIG. 1. For convenience of description, the random logical address rLBA is illustrated in FIG. 3 as numerical values.

It is assumed that the sequentializer 113 receives a write request five times and it is assumed that the sequentializer 113 sequentially receives the random logical addresses rLBA of 10, 15, 2, 5, and 3. The random logical addresses rLBA provided together with the write requests are not sequential. A write operation for the storage device 120 may be requested due to various causes that are provided by the application 114 of FIG. 2. In the case where a write operation is performed on the storage device 120 based on the random logical address rLBA, data respectively corresponding to write requests may be written in various storage areas. This may cause a decrease in operation speed.

The sequentializer 113 may convert the random logical address rLBA into a device logical address dLBA. For convenience of description, the device logical address dLBA is illustrated in FIG. 3 as numerical values. The device logical address dLBA may have sequential values of 1, 2, 3, 4, and 5. As such, a logical storage area of data to be stored in the storage device 120 may have a sequential characteristic. In this case, the write speed of the storage device 120 may increase. In particular, a write speed of a storage device including the TLC or the QLC is lower than a write speed of a storage device including the SLC. As the sequentializer 113 converts a random write operation to a sequential write operation, the write speed of the storage system 100 may be improved.

Figure 4:
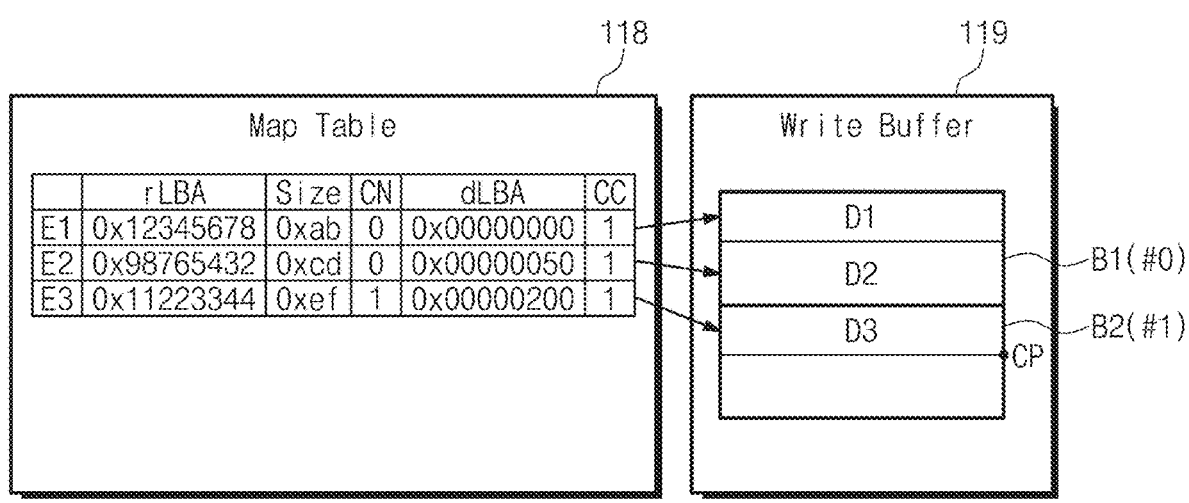
FIG. 4 is an example diagram for operations of a map table and a write buffer included in a sequentializer of FIGS. 1 and 2.

FIG. 4 is an example diagram for operations of a map table and a write buffer included in a sequentializer of FIGS. 1 and 2. Referring to FIG. 4, the map table 118 and the write buffer 119 may be driven by the sequentializer 113. The map table 118 and the write buffer 119 correspond to the map table 118 and the write buffer 119 of FIG. 2, respectively. For convenience of description, FIG. 4 will be described with reference to reference numerals/marks of FIG. 1.

The map table 118 may include a write requested logical address (e.g., the random logical address rLBA), a size of write requested data, identification information CN of the write buffer 119, the device logical address dLBA, and flush information CC. The random logical address rLBA is defined as a logical address that is provided by the processor 111 together with a write request. The identification information CN is defined as identification information of a buffer, in which relevant data are stored, from among buffers B1 and B2 included in the write buffer 119. The flush information CC is defined as information for determining whether relevant data are flushed to the storage device 120 or are stored in the write buffer 119 without being flushed to the storage device 120.

Depending on a first write request, a first logical address and first data D1 may be provided to the sequentializer 113. In this case, a first entry E1 corresponding to the first write request may be recorded at the map table 118. The sequentializer 113 may allocate a storage area of the memory module 112, in which the write buffer 119 is able to be implemented, to the first buffer B1. A size of data that are able to be stored in the first buffer B1 may be set in advance and may be fixed to, for example, 128 KB.

The sequentializer 113 may convert the first logical address to a first device logical address. In the case of the first write request, the first device logical address may have the smallest value such as "0x00000000". The first data D1 may be stored in the first buffer B1 that the first device logical address indicates. Then, values included in the first entry E1 may be determined. For example, the identification information CN may have a value of "0" corresponding to the first buffer B1.

Afterwards, depending on a second write request, a second logical address and second data D2 may be provided to the sequentializer 113. In this case, a second entry E2 corresponding to the second write request may be recorded at the map table 118. The sequentializer 113 may convert the second logical address to a second device logical address based on the first device logical address and the size of the first data D1. The second device logical address may indicate a storage area that is logically continuous to the area where the first data D1 are stored. To this end, the sequentializer 113 may add the first device logical address and the size of the first data D1 to determine a second device logical address.

A start point of the storage area where the second data D2 are stored may be identified by a current pointer CP. When the first data D1 are written in the first buffer B1, the current pointer CP may indicate an area (or location) where the last bit of the first data D1 is stored. The second device logical address may be determined such that the first bit of the second data D2 is continuous to the last bit of the first data D1. Because the second device logical address depends on the area where the last bit of the first data D1 is stored, the second device logical address may be determined in consideration of the size of the first data D1.

When a sum of the size of the first data D1 and the size of the second data D2 is smaller than a size of a storage area of the first buffer B1, the second data D2 may be stored in the first buffer B1 so as to be continuous to the first data D1. When the second data D2 are stored, the current pointer CP may move to an area where the last bit of the second data D2 is stored. The identification information CN of the second entry E2 may be identical to the identification information CN of the first entry E1.

Afterwards, depending on a third write request, a third logical address and third data D3 may be provided to the sequentializer 113. In this case, a third entry E3 corresponding to the third write request may be recorded at the map table 118. As described above, the sequentializer 113 may convert the third logical address to a third device logical address based on the second device logical address and the size of the second data D2. When it is impossible to store the third data D3 in the first buffer B1, the sequentializer 113 may further allocate the second buffer B2. A size of data that are able to be stored in the second buffer B2 may be set to be identical to the size of the first buffer B1 and may be fixed to, for example, 128 KB. The third data D3 may be stored in the second buffer B2, and the current pointer CP may move as illustrated in FIG. 4. The identification information CN of the third entry E3 may have a value of "1" corresponding to the second buffer B2.

The first to third data D1 to D3 stored in the write buffer 119 may be written in the storage device 120 based on the device logical address dLBA. The first to third data D1 to D3 may be flushed to the storage device 120 together. When the number of allocated buffers of the write buffer 119 exceeds a reference value, buffers may be selected from the allocated buffers as much as the reference value, and data stored in the selected buffers may be flushed to the storage device 120 together. The reference value may be in advance set by the sequentializer 113 and may be, for example, 32. When the first to third data D1 to D3 are completely flushed, the flush information CC may be changed from "1" to "0".

Storage areas of the storage device 120 may be provided to correspond to the buffers B1 and B2, respectively. The nonvolatile memory device 122 of the storage device 120 may be divided into storage areas each having the size of each of the buffers B1 and B2. For example, the first and second data D1 and D2 may be stored in a first storage area of the nonvolatile memory device 122, and the third data D3 may be stored in a second storage area of the nonvolatile memory device 122. The total size of buffers selected as much as the reference value may be a size unit of data that are provided from the host 110 to the storage device 120 and may be a size unit of data targeted for a sequential write operation. A size of one buffer may be defined as a unit of an erase operation to be described later.

Figure 5:
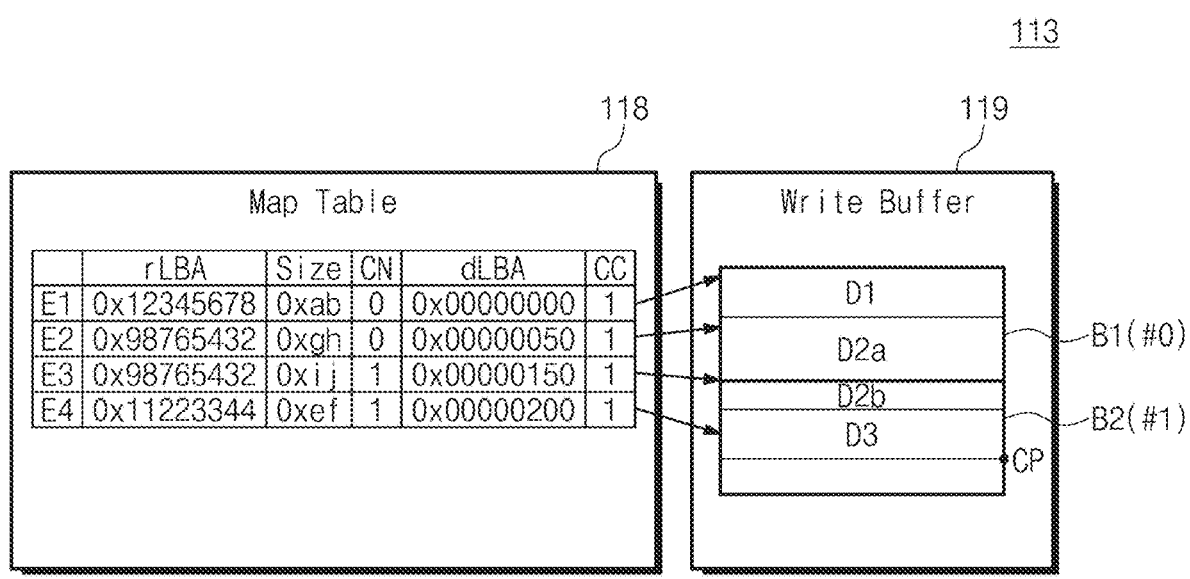
FIG. 5 is an example diagram for operations of a map table and a write buffer included in a sequentializer of FIGS. 1 and 2.

FIG. 5 is an example diagram for operations of a map table and a write buffer included in a sequentializer of FIGS. 1 and 2. Referring to FIG. 5, the map table 118 and the write buffer 119 may be driven by the sequentializer 113. The map table 118 and the write buffer 119 correspond to the map table 118 and the write buffer 119 of FIG. 2, respectively. For convenience of description, a description will be focused on a difference between FIG. 4 and FIG. 5.

The first entry E1 corresponding to the first write request may be recorded at the map table 118, and the first data D1 may be stored in the first buffer B1. Afterwards, the second entry E2 corresponding to the second write request may be recorded at the map table 118, and a portion (e.g., a first portion D2a) of the second data may be stored in the first buffer B1. The whole of the second data may fail to be stored in the first buffer B1. In this case, at least a portion of the second data may be stored in the first buffer B1 so as to be continuous to the first data D1, and the remaining portion (e.g., a second portion D2b) of the second data may be stored in the second buffer B2 that is additionally allocated.

That is, the second data corresponding to the second write request may be divided into the first portion D2a and the second portion D2b depending on buffers storing the second data. The second entry E2 corresponding to the first portion D2a and the third entry E3 corresponding to the second portion D2b may be recorded at the map table 118 independently of each other. The identification information CN of the second entry E2 may have a value of "0" corresponding to the first buffer B1, and the identification information CN of the third entry E3 may have a value of "1" corresponding to the second buffer B2.

The device logical address dLBA of the second entry E2 may be calculated based on the device logical address dLBA of the first entry E1 and the size of the first data D1. The device logical address dLBA of the third entry E3 may be calculated based on the device logical address dLBA of the second entry E2 and the size of the first portion D2a. The device logical address dLBA of a fourth entry E4 may be calculated based on the device logical address dLBA of the third entry E3 and the size of the second portion D2b.

Figure 6:
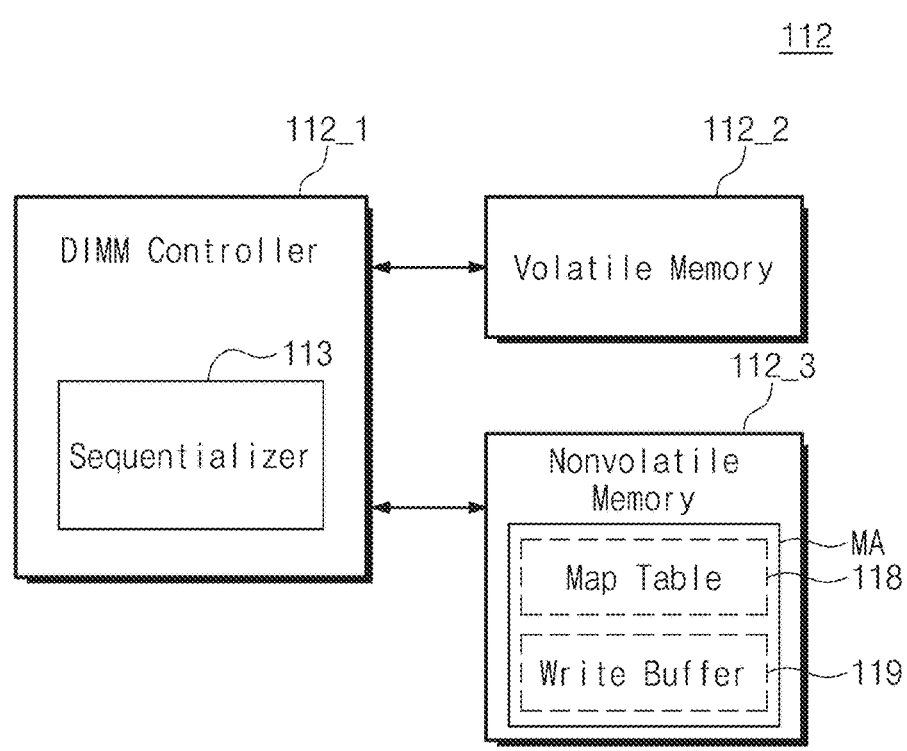
FIG. 6 is a block diagram illustrating a memory module of FIG. 1.

FIG. 6 is a block diagram illustrating a memory module of FIG. 1. In some example embodiments, the memory module 112 may be implemented with an NVDIMM-P or an NVDIMM-N. Referring to FIG. 6, the memory module 112 may include a DIMM controller 112_1, a volatile memory device 112_2, and a nonvolatile memory device 112_3.

The DIMM controller 112_1 may receive a logical address and a command including a write request, a read request, or an erase request from the processor 111 of FIG. 1. The DIMM controller 112_1 may further receive a clock signal and a control signal. The DIMM controller 112_1 may access the volatile memory device 112_2 or the nonvolatile memory device 112_3 based on the command, the logical address, the clock signal, and the control signal. Although not illustrated in drawings, the DIMM controller 112_1 may exchange data with the processor 111 or the storage device 120 through data buffers (not illustrated).

The DIMM controller 112_1 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The sequentializer 113 may be implemented in the DIMM controller 112_1. The sequentializer 113 may manage the map table 118 and the write buffer 119. The sequentializer 113 may convert a received logical address into a device logical address based on the map table 118. When a write request is received, the sequentializer 113 may determine whether to allocate an additional write buffer 119 (or a write buffer area) based on the map table 118 that is previously recorded.

The volatile memory device 112_2 may include a high-speed volatile memory such as a DRAM. The volatile memory device 112_2 may include a plurality of volatile memories. For example, the plurality of volatile memories may be implemented with packages that are separated from each other. The map table 118 and the write buffer 119 that are generated by the sequentializer 113 may be stored in the volatile memory device 112_2, and the map table 118 and the write buffer 119 may be stored in a memory area MA of the nonvolatile memory device 112_3 periodically or randomly.

The nonvolatile memory device 112_3 may include a nonvolatile memory. For example, the nonvolatile memory device 112_3 may include a plurality of nonvolatile memories implemented with packages that are separated from each other. The nonvolatile memory device 112_3 may include one of various nonvolatile memories such as a flash memory, a phase change memory, a ferroelectric memory, a resistive memory, and a magnetoresistive memory.

The memory area MA where the map table 118 and the write buffer 119 are stored may be determined under control of the DIMM controller 112_1 or the sequentializer 113. In the case where the map table 118 and the write buffer 119 are allocated to the memory area MA of the nonvolatile memory device 112_3, entries and data stored in the map table 118 may be reduced or prevented from being lost due to an unexpected event such as a sudden power-off. The memory module 112 according to some example embodiments of the inventive concepts may be more stable than the DRAM and may process, store, and manage data at a higher speed than the SSD.

Figure 7:
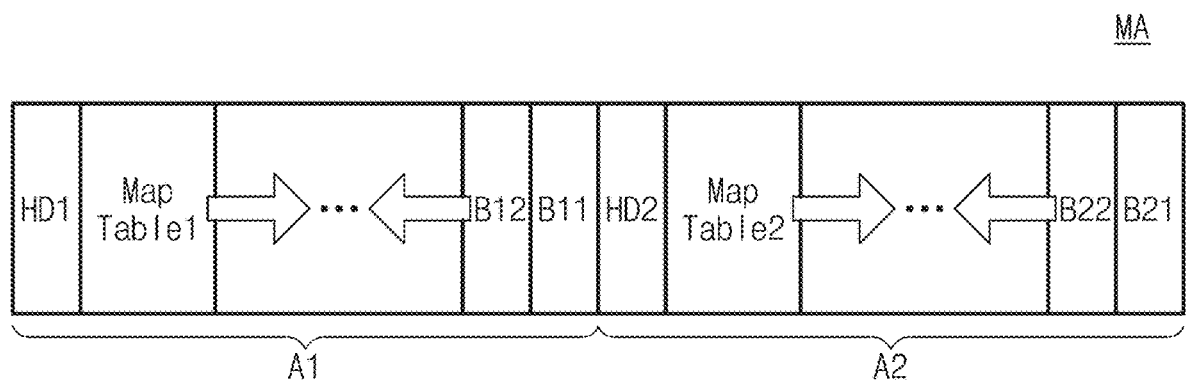
FIG. 7 is a diagram for describing a map table and a write buffer allocated to a memory area of FIG. 6.

FIG. 7 is a diagram for describing a map table and a write buffer allocated to a memory area of FIG. 6. The memory area MA illustrated in FIG. 7 may be understood as a logical storage area where data are stored. For convenience of description, FIG. 7 will be described with reference to reference numerals/marks of FIG. 6.

Referring to FIG. 7, the memory area MA may be divided into a plurality of areas A1 and A2. The number of areas A1 and A2 depends on the number of storage devices 120 of FIG. 1. For example, in the case where the number of storage devices 120 is 2, the memory area MA may be divided into two areas A1 and A2. Data stored in the first area A1 may be transferred to a first storage device, and data stored in the second area A2 may be transferred to a second storage device.

The DIMM controller 112_1 may allocate a first header area HD1, a first map table area, and first write buffer areas B11 and B12 to the first area A1. As in the above description, the DIMM controller 112_1 may allocate a second header area HD2, a second map table area, and second write buffer areas B21 and B22 to the second area A2. Because kinds of information stored in the first area A1 and the second area A2 are identical, a description will be given with reference to the first area A1.

Although the number of buffer areas B11 and B12 in the example embodiments are illustrated as being two, this is merely for convenience of explanation, and is not meant to limit the number of buffer areas. The DIMM controller 112_1 of the example embodiments of the the inventive concepts may allocate any number of buffer areas.

Meta data may be stored in the first header area HD1. When the storage system 100 is initialized or is shut down, the first header area HD1 may be allocated by the DIMM controller 112_1. For example, the meta data may include information about the storage device 120, a size of the first map table area, a size of each of the first write buffer areas B11 and B12, the number of first write buffer areas B11 and B12, an offset value between logical addresses of the first write buffer areas B11 and B12, etc.

The map table 118 that is generated and managed by the sequentializer 113 may be stored in the first map table area. The DIMM controller 112_1 may allocate the first map table area. The size of the first map table area may be fixed or variable. For example, the DIMM controller 112_1 may dynamically allocate the first map table area based on the number of entries included in the map table 118. In the case where the number entries included in the map table 118 increases, the DIMM controller 112_1 may expand the first map table area as illustrated by an arrow.

Write requested data may be stored in the write buffer areas B11 and B12. The DIMM controller 112_1 may allocate the first map table area. The number of write buffer areas B11 and B12 may be varied based on the total size of write requested data. For example, in the case where a size of newly write requested data is large to such an extent not to be stored in the current write buffer areas B11 and B12, the DIMM controller 112_1 may allocate a new write area. In this case, the DIMM controller 112_1 may expand the write buffer areas B11 and B12 as illustrated by an arrow.

Figure 8:
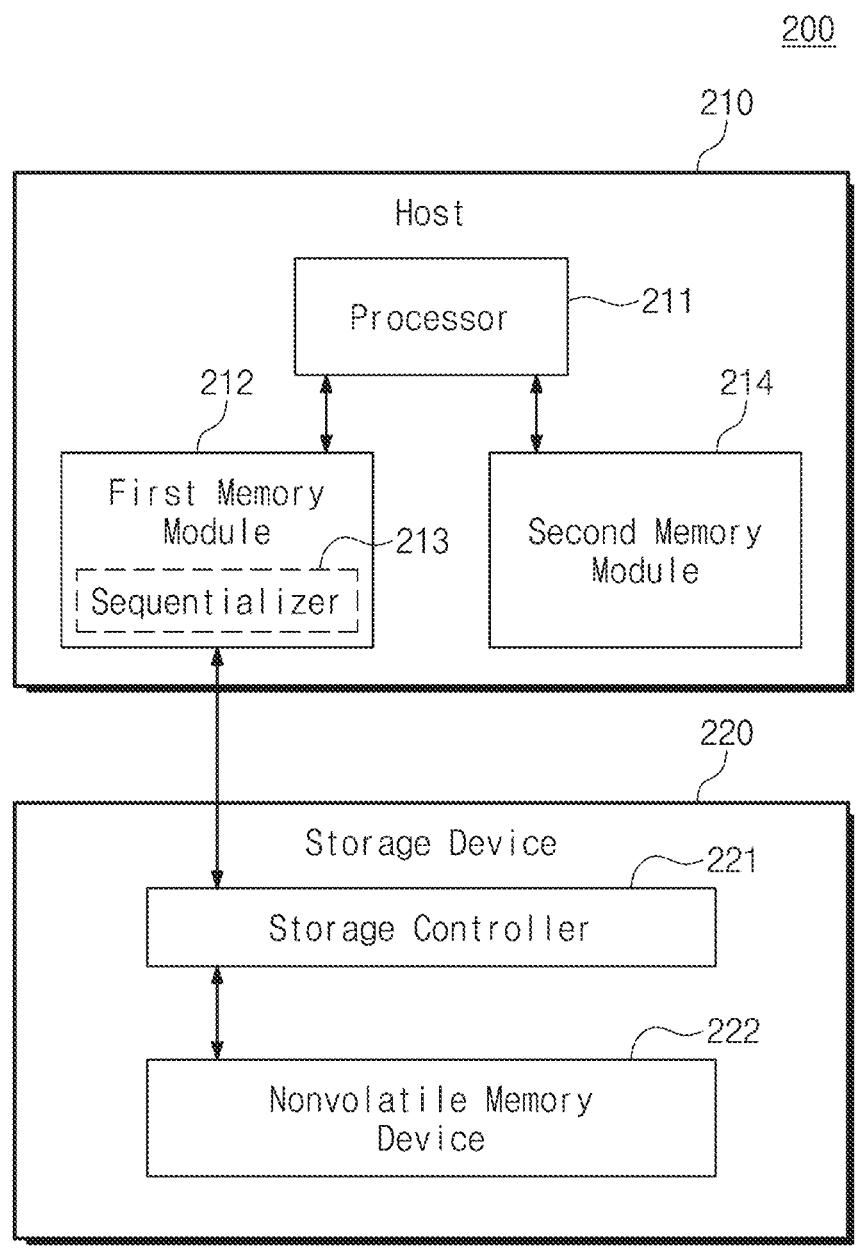
FIG. 8 is a block diagram of a storage device according to some example embodiments of the inventive concepts.

FIG. 8 is a block diagram of a storage device according to some example embodiments of the inventive concepts.

Referring to FIG. 8, a storage system 200 may include a host 210 and a storage device 220. The host 210 may include a processor 211, a first memory module 212, and a second memory module 214. A sequentializer 213 may be implemented in the first memory module 212. The storage device 220 may include a storage controller 221 and a nonvolatile memory device 222. The remaining components other than the second memory module 214 correspond to the components of FIG. 1, and thus, additional description will be omitted to avoid redundancy.

The second memory module 214 may include at least one volatile memory device. For example, the second memory module 214 may include a high-speed volatile memory such as a DRAM. The second memory module 214 may include a plurality of volatile memories implemented with packages that are separated from each other.

When a write request, a read request, or an erase request is received, the second memory module 214 may be provided to search a map table for an address, which is identical to a logical address that the first memory module 212 receives. The first memory module 212 may convert a random logical address to a sequential logical address (or a device logical address) such that the storage device 220 performs a sequential write operation. The random logical address and the device logical address may be recorded at the map table. The second memory module 214 may generate a lookup tree that makes it possible to access random logical addresses and adjacent random logical addresses of the map table. Here, the adjacent random logical address may be understood as values of the remaining bit positions other than a specific bit position(s) of a random logical address recorded at a map table are identical.

For example, the lookup tree may be Radix tree. The Radix tree may divide a random logical address in the unit of bit (or bit position), and may connect nodes (or leafs) corresponding to each bit value (or bit position) on the basis of a root. The second memory module 214 may look up whether the same logical address as the received logical address is recorded, based on the Radix tree. Alternatively, the second memory module 214 may look up whether a logical address belonging to a range defined by the received logical address and a size of data to be read or erased is recorded at an entry, based on the Radix tree.

The first memory module 212 may determine whether a write operation is overwritable, based on the Radix tree implemented in the second memory module 214. For example, when a searching result of the second memory module 214 indicates that the same logical address as write requested logical address is recorded at an entry, the first memory module 212 may determine that a current write operation is an overwrite operation and may not perform a write operation corresponding to the current write request.

The first memory module 212 may determine a read range where a read operation is performed or an erase range where an erase operation is performed, based on the Radix tree. For example, the second memory module 214 may determine whether a random logical address belonging to a logical address range defined by a read requested logical address and a size of data is recorded at an entry, based on the Radix tree. When there is no recorded entry, the second memory module 214 may increase a node level of the Radix tree as much as one and may search for an adjacent logical address. The first memory module 212 may determine whether data corresponding to the adjacent logical address is targeted for a read operation, in consideration of a size of data corresponding to the adjacent logical address. A write operation, a read operation, and an erase operation using the Radix tree will be more fully described later.

Figure 9:
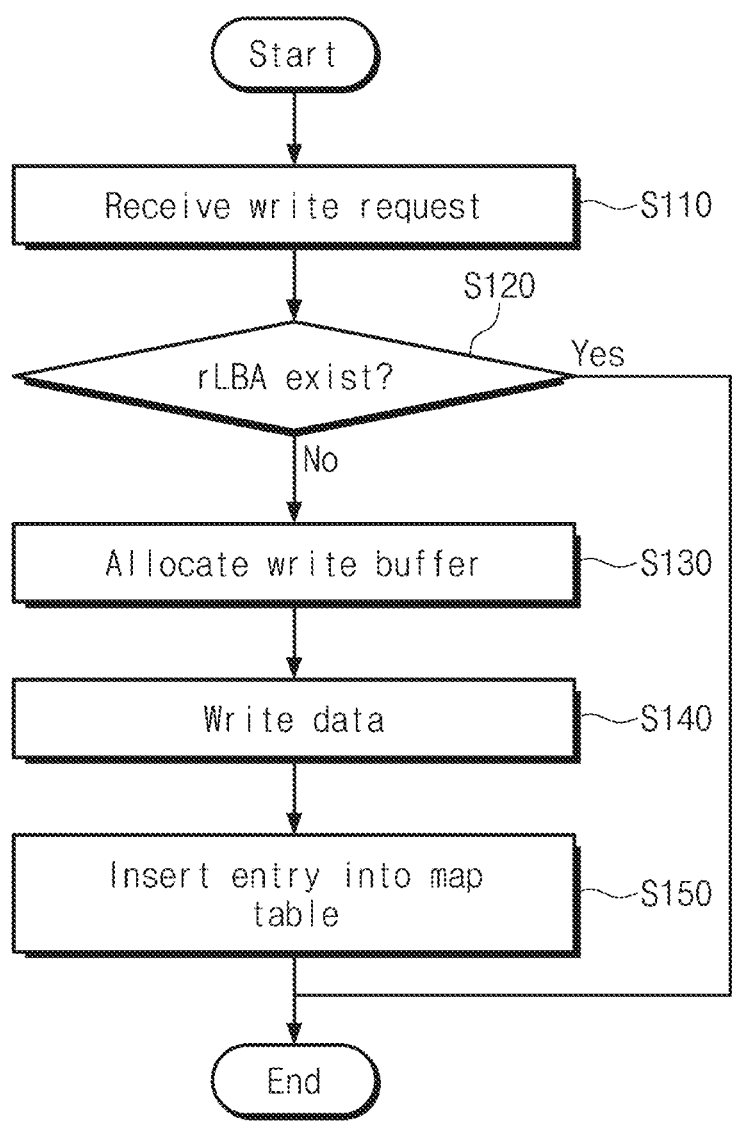
FIG. 9 is a flowchart illustrating an operating method of a memory module described in FIGS. 1 to 8.

FIG. 9 is a flowchart illustrating an operating method of a memory module described in FIGS. 1 to 8. Operations of FIG. 9 may be performed by the memory module 112 of FIG. 1 or the first memory module 212 of FIG. 8 or may be performed by the sequentializer 113 or 213. For convenience of description, FIG. 9 will be described with reference to reference marks/numerals of FIG. 8.

In operation S110, the first memory module 212 receives a write request from the processor 211. The first memory module 212 may receive data and a logical address together with the write request.

In operation S120, the first memory module 212 may determine whether a random logical address identical to the logical address corresponding to the received write request is present in an entry of a map table. For example, the second memory module 214 may search for a random logical address identical to the received logical address, based on the lookup tree. When the same random logical address is present in the entry, the first memory module 212 may determine that the received write request is an overwrite operation and may terminate the write operation. When the same random logical address is absent from the entry, operation S130 is performed.

Alternatively, the second memory module 214 may search for a random logical address belonging to a logical address range defined by the received logical address and a size of the data. Here, a lower limit of the logical address range may be defined by the received logical address, and an upper limit thereof may be defined by an address obtained by adding the size of the data to the logical address. When a random logical address belonging to the logical address range is present in the entry, the first memory module 212 may determine that the received write request is an overwrite operation and may terminate the write operation. When a random logical address belonging to the logical address range is absent from the entry, operation S130 is performed.

In operation S130, the first memory module 212 may allocate a write buffer area. The write buffer area may be allocated by using a memory device included in the first memory module 212. When a write buffer area where data are to be stored is absent or insufficient, the first memory module 212 may allocate a write buffer area. However, in the case where a write buffer area where data are to be stored is already secured through a previous write request, the first memory module 212 may not further allocate a separate write buffer area. In this case, the first memory module 212 may store the data in the write buffer area that is already provided.

In operation S140, the first memory module 212 may write the data in the write buffer area. The first memory module 212 may write the data in the write buffer area so as to be continuous to data written depending on a previous write request.

In operation S150, the first memory module 212 may insert a new entry into a map table. As described with reference to FIGS. 4 and 5, an entry may include a write requested logical address, a size of data, identification information of a write buffer area, a device logical address, and flush information. The first memory module 212 may extract identification information of the write buffer area where the data are written in operation S140. The first memory module 212 may calculate a current device logical address based on a device logical address and a data size included in a previously write requested entry.

Figure 10:
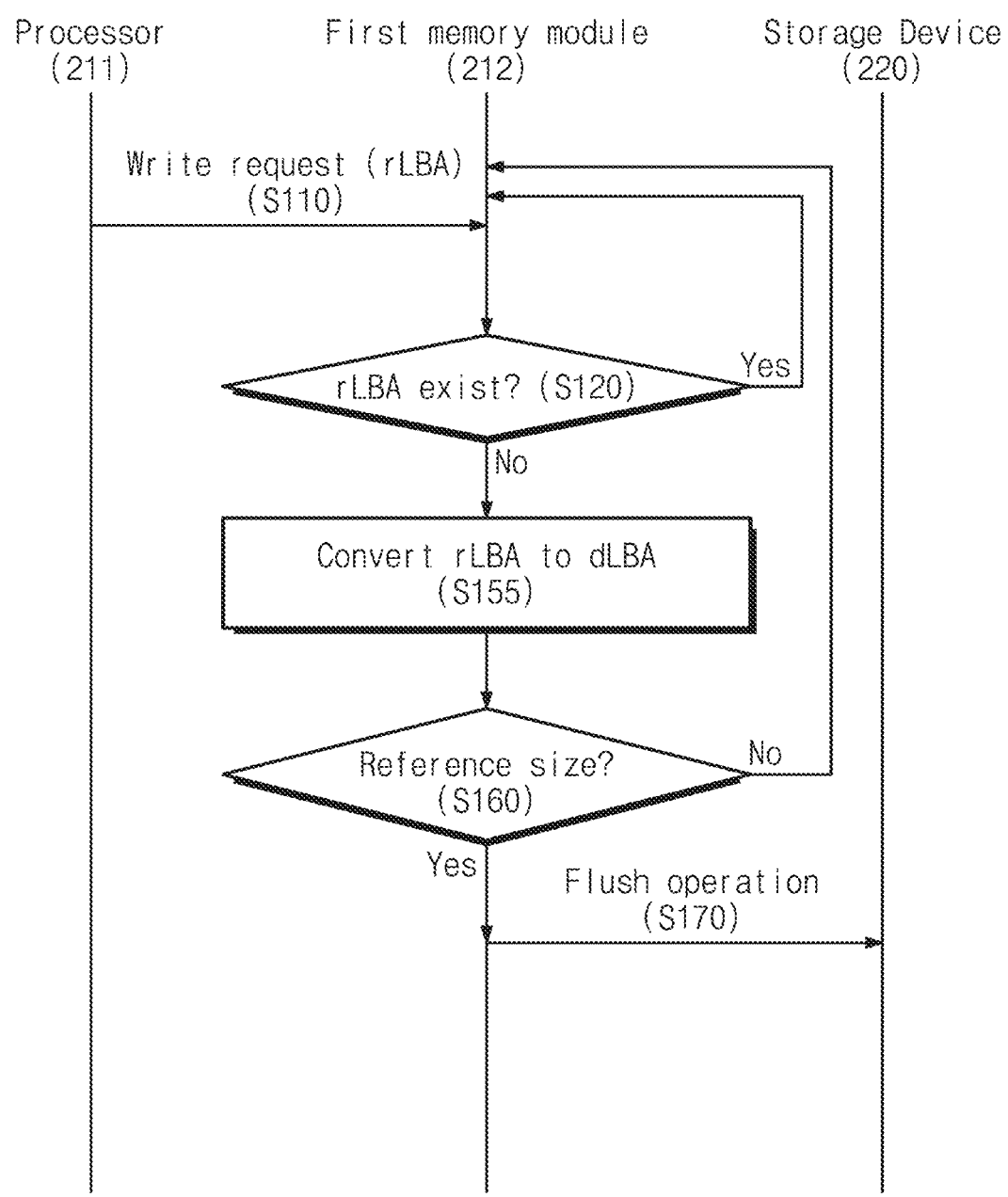
FIG. 10 is a flowchart illustrating a write operation method of a storage system described in FIGS. 1 to 8.

FIG. 10 is a flowchart illustrating a write operation method of a storage system described in FIGS. 1 to 8. Operations of FIG. 10 may be performed by the storage system 100 of FIG. 1 or the storage system 200 of FIG. 8. For convenience of description, FIG. 10 will be described with reference to reference marks/numerals of FIG. 8.

In operation S110, the processor 211 may transfer a write request and the logical address rLBA to the first memory module 212. In operation S120, the first memory module 212 may determine whether a random logical address identical to the logical address corresponding to the received write request is present in an entry of a map table. When the same random logical address is present in the entry, the first memory module 212 may determine that the received write request is an overwrite operation and may receive a new write request without a separate write operation. When the same random logical address is absent from the entry, operation S155 is performed. Operation S110 and operation S120 correspond to operation S110 and operation S120 of FIG. 9.

In operation S155, the first memory module 212 may convert a random logical address into a device logical address. The first memory module 212 may calculate a current device logical address based on a device logical address and a data size included in a previously write requested entry. For example, the first memory module 212 may calculate a current device logical address by adding a size of previous data to a previous device logical address.

The calculated device logical address may be recorded at a map table and may be used for a sequential write operation to be performed on the storage device 220. The data may be written in a memory device of the first memory module 212 based on the device logical address. The data may be written in a write buffer area of the memory device. As the number of write requests increases, the first memory module 212 may further allocate an additional write buffer area.

In operation S160, whether the total size of data stored in write buffer areas of the first memory module 212 is a reference size may be determined. The reference size may be a unit for transferring write data to the storage device 220. The first memory module 212 may receive a new write request and data until the total size of data reaches the reference size. When the total size of data reaches the reference size, operation S170 is performed.

In operation S170, the first memory module 212 may perform a flush operation to the storage device 220. As such, the data stored in the write buffer areas of the first memory module 212 are conveyed to the storage device 220. The storage device 220 may perform a sequential write operation of the received data based on the device logical address.

Figure 11:
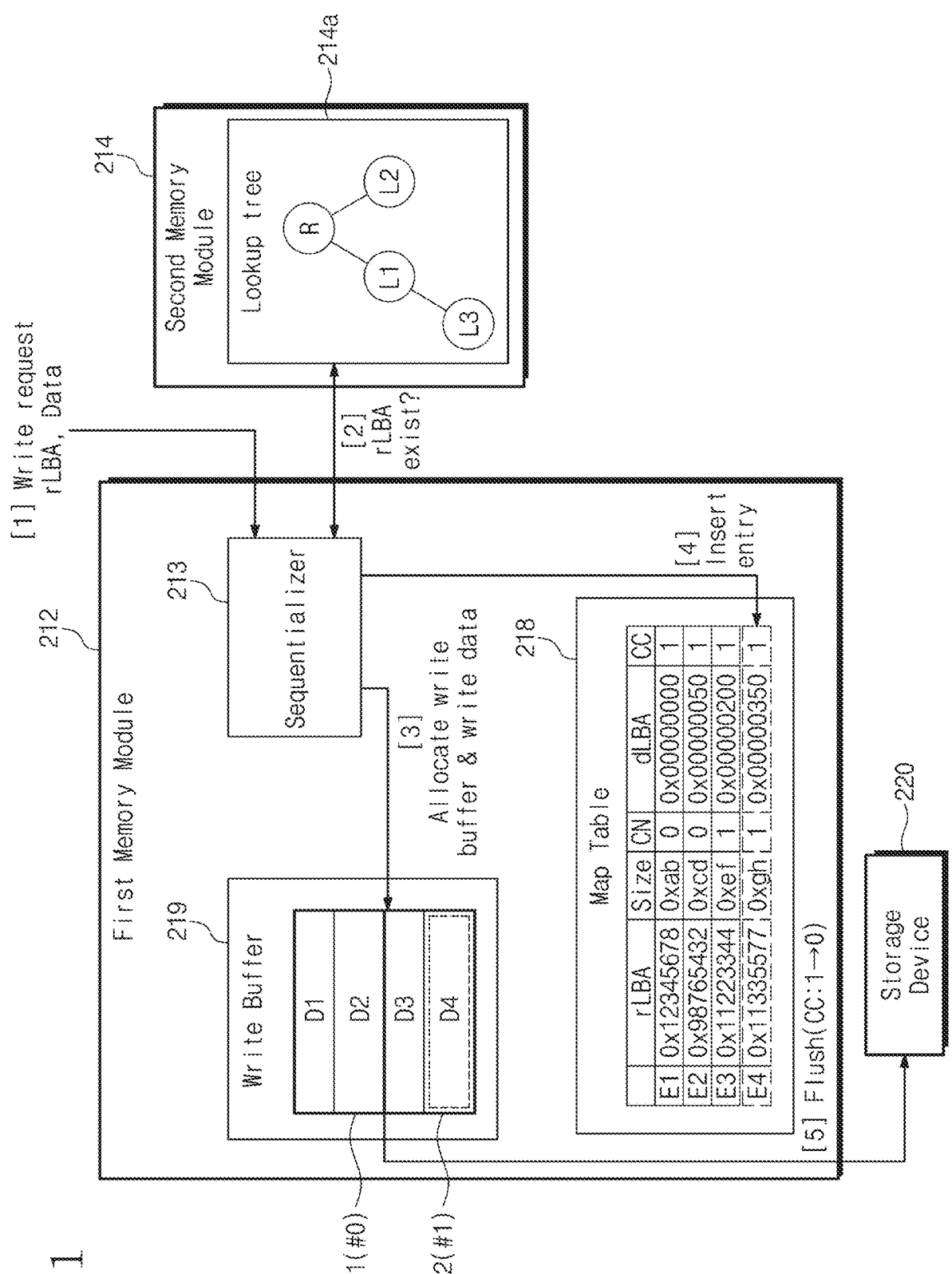
FIG. 11 is a diagram illustrating a write operation described in FIGS. 9 and 10 in detail.

FIG. 11 is a diagram illustrating a write operation described in FIGS. 9 and 10 in detail. The first memory module 212, the second memory module 214, and the storage device 220 of FIG. 11 correspond to the first memory module 212, the second memory module 214, and the storage device 220 of FIG. 8, respectively. The sequentializer 213, a map table 218, and a write buffer 219 may be implemented in the first memory module 212.

The sequentializer 213 may receive a write request, a random logical address, and data. The sequentializer 213 may determine whether the same address as the write requested random logical address is present in the map table. To this end, a lookup tree 214a implemented in the second memory module 214 may be used. Before a write request is received, the second memory module 214 may read the random logical addresses rLBA included in first to third entries E1 to E3 of the map table 118 and may generate the lookup tree 214a based on the read random logical addresses rLBA. The lookup tree 214a may be a Radix tree where a root "R" and leafs L1, L2, and L3 are connected, as illustrated in FIG. 11. When it is determined that the same random logical address as the received random logical address is present, the sequentializer 213 may determine that the requested write operation is an overwrite operation and may not perform an operation any more.

When the same random logical address as the received random logical address is absent, the sequentializer 213 may write the received data in the write buffer 219. In some example embodiments, it is assumed that the first to third data D1 to D3 are present in the write buffer 119 before fourth data D4 are received. The first and second data D1 and D2 are present in the first buffer B1, and the third data D3 are present in the second buffer B2. When a size of a free storage area of the second buffer B2 is equal to or larger than the size of the fourth data D4, the sequentializer 213 may not allocate an additional buffer. In this case, the fourth data D4 may be stored in the second buffer B2.

The sequentializer 213 may insert a fourth entry E4 corresponding to the fourth data D4 into the map table 218. The fourth entry E4 may include a received random logical address, a size of the fourth data D4, the identification information CN of the write buffer 219, a device logical address, and the flush information CC. The sequentializer 213 may convert the random logical address into a device logical address. The device logical address of the fourth entry E4 may be calculated based on the device logical address of the third entry E3 and the size of the third data D3. Because the fourth data D4 are stored in the second buffer B2, the identification information CN of the write buffer 219 may be "1". Before the fourth data D4 are flushed to the storage device 220, the flush information CC may be "1".

When the total size of data stored in the write buffer 219 is equal to or larger than the reference size, the first to fourth data D1 to D4 may be flushed to the storage device 220. Alternatively, when the number of allocated buffers in the write buffer 219 exceeds a reference value, the first to fourth data D1 to D4 may be flushed to the storage device 220. In a flush operation, the flush information of the first to fourth entries E1 to E4 may be changed to "0".

The storage device 220 may write the first to fourth data D1 to D4 in a nonvolatile memory device based on the device logical addresses. The nonvolatile memory device may include a first storage area corresponding to the first buffer B1 and a second storage area corresponding to the second buffer B2. The first and second data D1 and D2 may be written sequentially in the first storage area based on the device logical addresses. The third and fourth data D3 and D4 may be written sequentially in the second storage area based on the device logical addresses.

Figure 12:
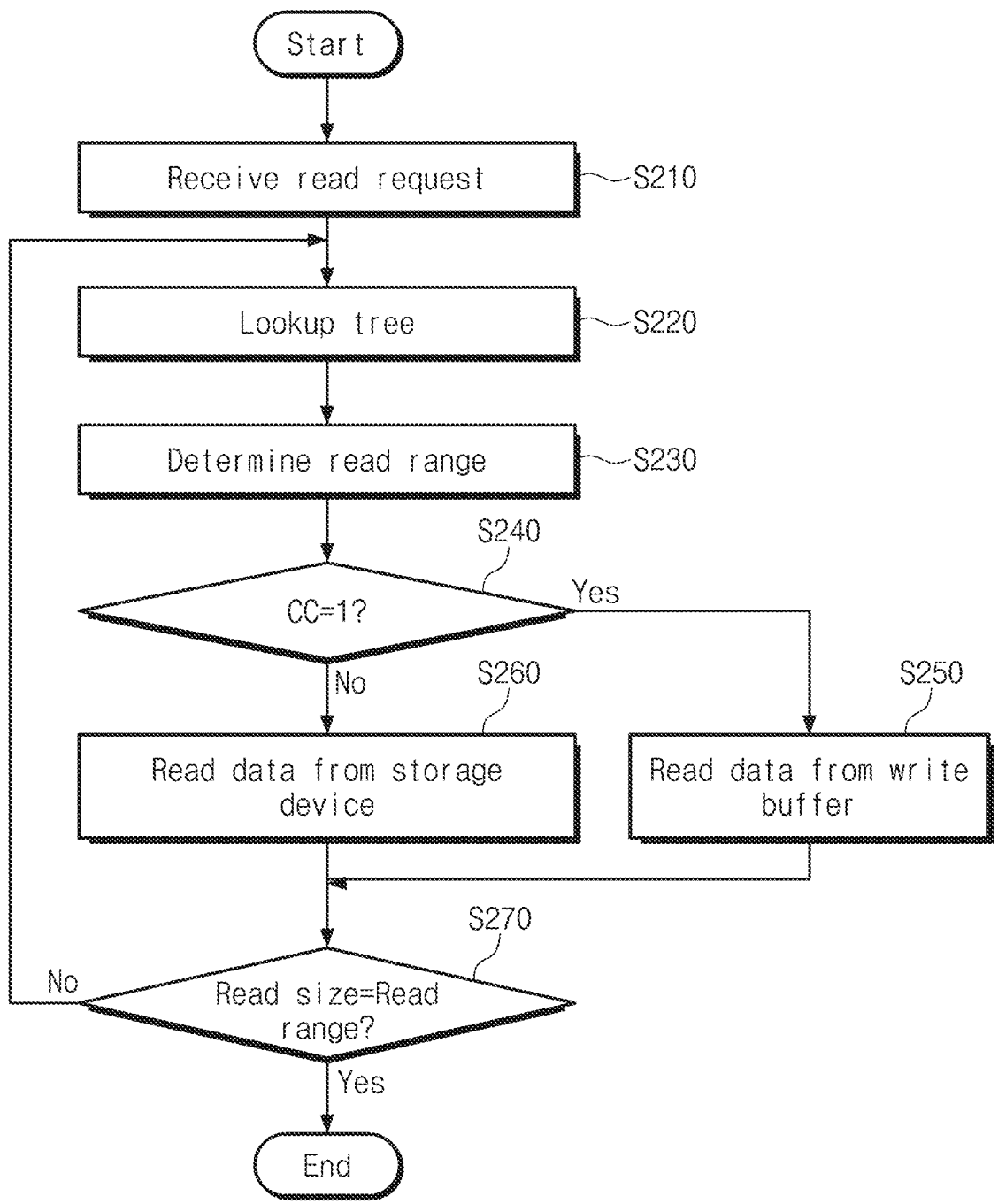
FIG. 12 is a flowchart illustrating a read operation method of a storage system described in FIGS. 1 to 8.

FIG. 12 is a flowchart illustrating a read operation method of a storage system described in FIGS. 1 to 8. Operations of FIG. 12 may be performed by the storage system 100 of FIG. 1 or the storage system 200 of FIG. 8. For convenience of description, FIG. 12 will be described with reference to reference marks/numerals of FIG. 8.

In operation S210, the first memory module 212 may receive a read request. The first memory module 212 may receive a logical address together with the read request.

In operation S220, the second memory module 214 may search a lookup tree based on the logical address corresponding to the received read request. For example, the second memory module 214 may search for a random logical address belonging to a logical address range defined by the received logical address and a size of read requested data. Here, a lower limit of the logical address range may be defined by the received logical address, and an upper limit thereof may be defined by an address obtained by adding the size of the data to the logical address. When a random logical address is not found, the second memory module 214 may increase a node level of the Radix tree as much as one and may search for an adjacent logical address. The first memory module 212 may determine whether at least a portion of data corresponding to a relevant entry is targeted for a read operation, in consideration of a size of data corresponding to the adjacent logical address.

In operation S230, the first memory module 212 may determine a read range. When a random logical address belonging to the logical address range is present, the first memory module 212 may determine that data corresponding to the random logical address is targeted for a read operation. When a random logical address is not found, the first memory module 212 may determine a read target in consideration of a size of data corresponding to the found adjacent logical address. The first memory module 212 may determine whether at least a portion of data corresponding to the adjacent logical address belongs to the logical address range. As such, a final read range may be determined.

In operation S240, the first memory module 212 may analyze the flush information CC of entries included in the read range. Because the case where the flush information CC is "1" indicates that data are not yet flushed to the storage device 220, operation S250 is performed. In operation S250, the first memory module 212 may read data from a write buffer. Because the case where the flush information CC is "0" indicates that data are flushed to the storage device 220, operation S260 is performed. In operation S260, the first memory module 212 may read data from the storage device 220.

In operation S270, when the read range read in operation S250 or operation S260 reaches a size of the read requested data, the read operation is terminated. However, when the read range thus read does not reach the size of read requested data, operation S220 to operation S270 are repeated. That is, the searching for an entry may be performed until the size of the read requested data is satisfied. The first memory module 212 may read data belonging to another entry.

The read operation is performed based on a device logical address applied to the storage device 220. However, because the processor 211 does not know the device logical address, a read operation may be requested from the first memory module 212 by using the random logical address. Accordingly, because the random logical address is not sorted sequentially in the map table 118, the lookup tree may be used for the ease of a search operation.

Figure 13:
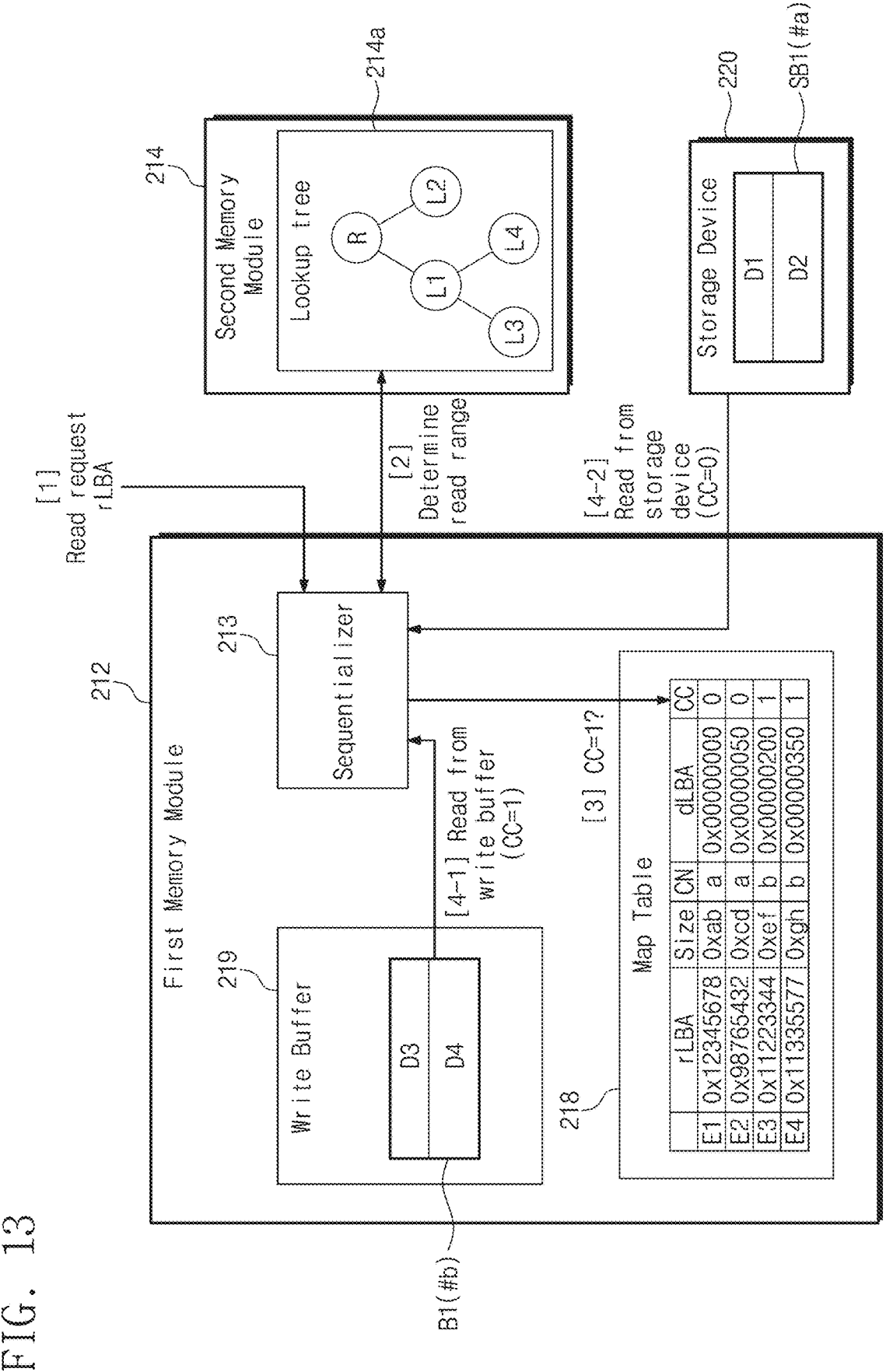
FIG. 13 is a diagram illustrating a read operation described in FIG. 12 in detail.

FIG. 13 is a diagram illustrating a read operation described in FIG. 12 in detail. The first memory module 212, the second memory module 214, and the storage device 220 of FIG. 13 correspond to the first memory module 212, the second memory module 214, and the storage device 220 of FIG. 8, respectively. The sequentializer 213, the map table 218, and the write buffer 219 may be implemented in the first memory module 212. The write buffer 219 may include a first buffer B1, and the storage device 220 may include a first storage area SB1. A size of the first buffer B1 may be identical to a size of the first storage area SB1. Here, the first storage area SB1 may be a logical storage area that is accessed by using a device logical address.

The sequentializer 213 may receive a read request and a random logical address. The sequentializer 213 may determine a read range based on the lookup tree 214a implemented in the second memory module 214. The lookup tree 214a may be the Radix tree where the root "R" and leafs L1, L2, L3, and L4 are connected. For example, the second memory module 214 may search for a random logical address belonging to a logical address range defined by the received logical address and a size of read requested data. When a random logical address is not found, the second memory module 214 may increase a node level of the lookup tree 214a as much as one (e.g., may increase a node level from the third leaf L3 to the first leaf L1) and may search for an adjacent logical address recorded at an entry. A read range may be determined based on the found result.

The sequentializer 213 may analyze the flush information CC of entries included in the read range. Because the case where the flush information CC is "1" indicates that data are not yet flushed to the storage device 220, the sequentializer 213 may read data from the write buffer 219. For example, the third data D3 or the fourth data D4 included in the first buffer B1 of the write buffer 219 may be read. Because the case where the flush information CC is "0" indicates that data are flushed to the storage device 220, the sequentializer 213 may read data from the storage device 220. For example, the first data D1 or the second data D2 included in the first storage area SB1 of the storage device 220 may be read.

Figure 14:
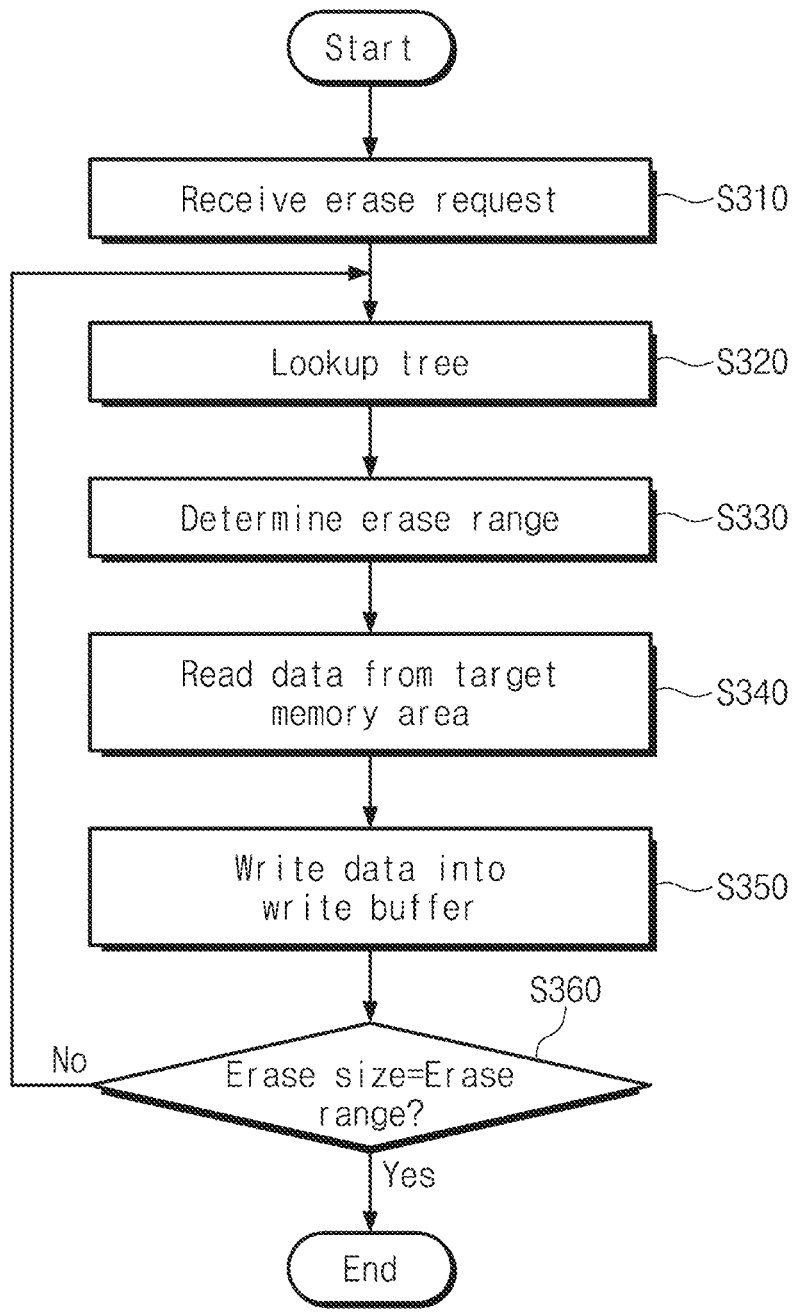
FIG. 14 is a flowchart illustrating an erase operation method of a storage system described in FIGS. 1 to 8.

The sequentializer 213 may determine whether the size of the read data, that is, the read range reaches the size of the read requested data. When it is determined that the read range does not reach the size of the read requested data, the searching for entries may be performed based on the lookup tree 214a until the read range reaches the size of the read requested data FIG. 14 is a flowchart illustrating an erase operation method of a storage system described in FIGS. 1 to 8. Operations of FIG. 14 may be performed by the storage system 100 of FIG. 1 or the storage system 200 of FIG. 8. For convenience of description, FIG. 14 will be described with reference to reference marks/numerals of FIG. 8.

In operation S310, the first memory module 212 may receive an erase request. The first memory module 212 may receive a logical address together with the erase request.

In operation S320, the second memory module 214 may search a lookup tree based on the logical address corresponding to the received erase request. A search operation that is performed in operation S320 is substantially identical to that in operation S220 of FIG. 12, and thus, additional description will be omitted to avoid redundancy. In operation S330, the first memory module 212 may determine an erase range based on a result found in operation S320. An erase range determining manner in operation S330 is substantially identical to that in operation S230 of FIG. 12, and thus, additional description will be omitted to avoid redundancy.

In operation S340, the first memory module 212 may read data from a storage area (e.g., a target memory area) targeted for the erase operation. Data that the first memory module 212 reads may be the remaining data of the target memory area other than data stored in the erase range. The erase operation may be performed in the unit of size of a storage area. The storage device 220 may erase data stored in the target memory area in response to the erase request.

In operation S340, a garbage collection operation may be performed on the storage area targeted for the erase operation. When a normal garbage collection operation is performed, data fail to be sequentially stored due to a device logical address. For this reason, the garbage collection operation may be performed in the unit of storage area corresponding to the size of the write buffer area.

In operation S350, the first memory module 212 may write the read data in the write buffer area. The read data may be smaller in size than the storage area. The read data may be stored in the write buffer area of the first memory module 212. A size of one write buffer area (e.g., the first buffer B1 of FIG. 4) may be identical to a size of the storage area. In this case, a size of data stored in the write buffer area may be smaller than the size of the write buffer area.

When the first memory module 212 receives an additional write request, data corresponding to the write request may be written in a relevant write buffer area. When the relevant write buffer area becomes full through merging with additional data, the first memory module 212 may write the data stored in the write buffer area in the target memory area.

In operation S360, when the erase range reaches a size of erase requested data, the erase operation is terminated. However, when the erase range does not reach the size of erase requested data, operation S320 to operation S360 are repeated. That is, the searching for entries may be performed until the size of the erase requested data is satisfied.

Figure 15:
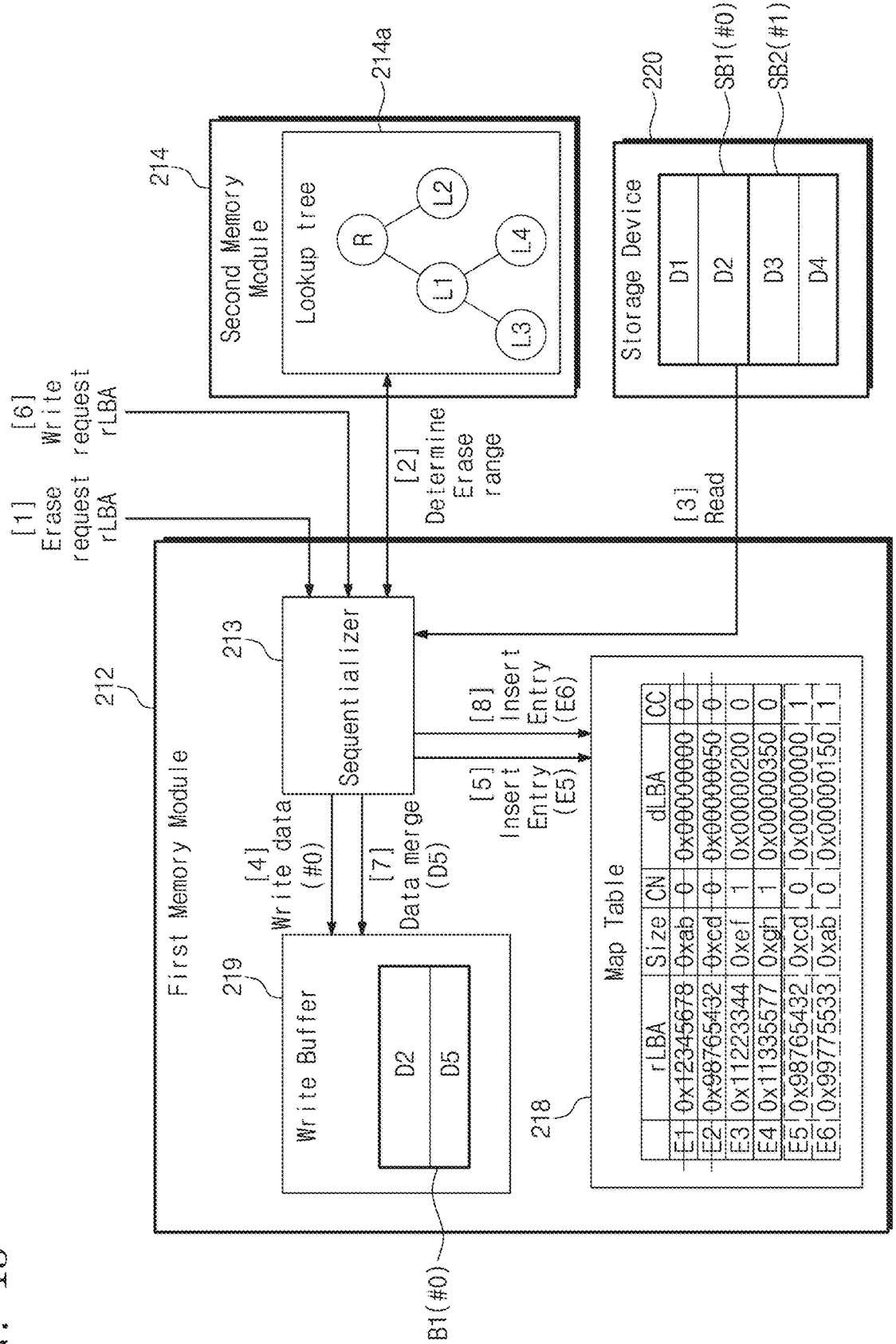
FIG. 15 is a diagram illustrating an erase operation described in FIG. 14 in detail.

FIG. 15 is a diagram illustrating an erase operation described in FIG. 14 in detail. The first memory module 212, the second memory module 214, and the storage device 220 of FIG. 15 correspond to the first memory module 212, the second memory module 214, and the storage device 220 of FIG. 8, respectively. The sequentializer 213, the map table 218, and the write buffer 219 may be implemented in the first memory module 212. The write buffer 219 may include the first buffer B1, and the storage device 220 may include the first storage area SB1 and a second storage area SB2. A size of the first buffer B1 may be identical to a size of each of the first storage area SB1 and the second storage area SB2. Here, the first storage area SB1 and the second storage area SB2 may be logical storage areas that are accessed by using device logical addresses.

The sequentializer 213 may receive an erase request and a random logical address. The sequentializer 213 may determine an erase range based on the lookup tree 214a implemented in the second memory module 214. The lookup tree 214a may be the Radix tree where the root "R" and leafs L1, L2, L3, and L4 are connected. For example, the second memory module 214 may search for a random logical address belonging to a logical address range defined by the received logical address and a size of erase requested data. When a random logical address is not found, the second memory module 214 may increase a node level of the lookup tree 214a as much as one and may search for an adjacent logical address. An erase range may be determined based on the found result.

The sequentializer 213 may read data stored in a storage area including the erase range. For example, it is assumed that the first data D1 are targeted for the erase operation. The sequentializer 213 may read the second data D2, which are not an erase target, of data stored in the first storage area SB1 including the erase range. The erase operation may be performed in the unit of size of a storage area. As described above, the size of each of the first and second storage areas SB1 and SB2 may be identical to the size of the first buffer B1. The storage device 220 may erase data stored in the first storage area SB1 including the erase range in response to the erase request.

The second data D2 read from the storage device 220 may be written in the first buffer B1 of the write buffer 219. A fifth entry E5 corresponding to the second data D2 may be inserted into the map table 218. For example, the fifth entry E5 may be identical to the second entry E2 except for the flush information CC and the device logical address dLBA.

Unlike the example illustrated in FIG. 15, a part of values of the second entry E2 may be revised (or changed) without inserting the fifth entry E5 into the map table 118.

Afterwards, a new write request, a random logical address, and fifth data D5 may be received. The sequentializer 213 may write the fifth data D5 in the first buffer B1. The sequentializer 213 may insert a sixth entry E6 corresponding to the fifth data D5 into the map table 218. An example is illustrated in FIG. 15 as the first and second entries E1 and E2 are deleted and the fifth and sixth entries E5 and E6 are added, but the inventive concepts are not limited thereto. For example, information of the first and second entries E1 and E2 may be revised to correspond to the fifth and sixth entries E5 and E6.

When data are stored in the first buffer B1 as much as the size of the first buffer B1, the data stored in the first buffer B1 may be flushed to the storage device 220. In this case, the second data D2 and the fifth data D5 may be stored in the first storage area SB1. As such, a free storage area may be filled on the basis of a device logical address. That is, a sequential characteristic of data may be maintained through the device logical address.

According to some example embodiments of the inventive concepts, a storage system including a nonvolatile memory module and an operating method of the nonvolatile memory module may improve the reliability of data by implementing a write buffer with a memory module including a nonvolatile memory device.

Also, according to some example embodiments of the inventive concepts, the storage system including the nonvolatile memory module and the operating method of the nonvolatile memory module may improve the performance of a storage device by increasing a write speed through a random write to sequential write conversion.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. A storage system comprising:
a processor configured to
request a write operation of first data corresponding to a first logical address, and
request a write operation of second data corresponding to a second logical address;
a memory module including
a nonvolatile memory device configured to store the first data and the second data, and
a controller configured to cause the memory module to
convert the first logical address into a first device logical address, and
convert the second logical address into a second device logical address based on the first device logical address and a size of the first data; and
a storage device configured to
store the first data in the storage device based on the first device logical address, and
store the second data in the storage device based on the second device logical address.

2. The storage system of claim 1, wherein the controller is further configured to cause the memory module to calculate the second device logical address by adding the size of the first data to the first device logical address.

3. The storage system of claim 1, wherein the controller is further configured to cause the memory module to allocate a first write buffer area having a given size to the nonvolatile memory device in response to a write request for the first data, and write the first data and at least a portion of the second data in the first write buffer area, when the size of the first data is smaller than the given size.

4. The storage system of claim 3, wherein the controller is further configured to cause the memory module to allocate a second write buffer area having the given size to the nonvolatile memory device in response to a write request of the second data, when a sum of the size of the first data and a size of the second data is larger than the given size, and write a remaining portion of the second data in the second write buffer area.

5. The storage system of claim 3, wherein, in response to an erase request, the controller is further configured to cause the memory module to, read third data different from erase requested data from a storage area of the storage device, the storage area being where the erase requested data are stored and having the given size, and write the third data in a second write buffer area allocated to the nonvolatile memory device.

6. The storage system of claim 5, wherein, in response to a write request for fourth data, the controller is further configured to cause the memory module to write at least a portion of the fourth data in the second write buffer area, and flush the third data and the at least the portion of the fourth data to the storage area, when a sum of a size of the third data and a size of the at least the portion of the fourth data written in the second write buffer area is identical to the given size.

7. The storage system of claim 1, wherein the controller is further configured to cause the memory module to generate a map table including logical address information including the first logical address and the second logical address, size information including the size of the first data and a size of the second data, and device logical address information including the first device logical address and the second device logical address.

8. The storage system of claim 7, wherein the map table further includes identification information of a memory area, and the identification information includes first identification information corresponding to a memory area where the first data are to be stored, and second identification information corresponding to a memory area where the second data are to be stored.

9. The storage system of claim 8, wherein the controller is further configured to cause the memory module to flush data stored in memory areas of the nonvolatile memory device to the storage device when a number of identification information included in the map table is equal to or greater than a reference value, the flushed data based on the reference value.

10. The storage system of claim 7, wherein the map table further includes flush information, and the flush information includes values which depend on whether the first data and the second data are flushed to the storage device.

11. The storage system of claim 10, wherein, in response to a read request, the controller is further configured to cause the memory module to, determine whether to read read-requested data from the nonvolatile memory device or from the storage device, the determination based on the flush information.

12. The storage system of claim 1, wherein the controller is further configured to cause the memory module to dynamically allocate a map table area and a write buffer area in the nonvolatile memory device, the map table area configured to store a map table and the write buffer area configured to store the first and second data.

13. The storage system of claim 1, wherein the controller is further configured to cause the memory module to generate a lookup tree in a volatile memory device, the lookup tree based on the first logical address, and in response to a write request for the second data, cause the memory module to determine whether a write operation corresponding to the second logical address includes an overwrite operation, the determination based on the lookup tree, the write operation included in the write request.

14. The storage system of claim 1, wherein the controller is further configured to generate a lookup tree in a volatile memory device, the lookup tree based on the first logical address and the second logical address, and in response to a read request corresponding to a third logical address, search the lookup tree for a logical address belonging to a logical address range defined by a third logical address and a size of read requested data.

15. The storage system of claim 14, wherein the controller is further configured to determine a read range based on the lookup tree, and read data corresponding to the read range from the nonvolatile memory device or the storage device.

16. An operating method of a nonvolatile memory module, the nonvolatile memory module included in a host controlling a storage device, the method comprising:

receiving a write request for first data corresponding to a first logical address;

allocating a write buffer area of a given size to a memory device in response to the write request for the first data;

converting the first logical address into a first device logical address;

writing the first data in the write buffer area;

receiving a write request for second data corresponding to a second logical address;

converting the second logical address into a second device logical address based on the first device logical address and a size of the first data; and writing at least a portion of the second data in the write buffer area.

17. The method of claim 16, further comprising:

inserting a first entry into a map table, the first entry including the first logical address, the first device logical address, identification information of the write buffer area, and the size of the first data; and inserting a second entry into the map table, the second entry including the second logical address, the second device logical address, the identification information, and a size of the at least the portion of the second data.

18. The method of claim 16, further comprising:

allocating a second write buffer area of the given size to the memory device, when a sum of the given of the first data and the size of the second data is larger than a storage area of the write buffer area.

19. The method of claim 18, further comprising:
writing a portion of the second data in the second write buffer area, the portion of the second data not being written in the write buffer area.

20. A storage system comprising:
a host including
- a processor configured to cause the host to generate a first logical address corresponding to first data and a second logical address corresponding to second data, and
- a controller configured to cause the host to
  - convert the first logical address into a first device logical address, and
  - convert the second logical address into a second device logical address based on the first device logical address and a size of the first data; and a storage device including
- a nonvolatile memory device, and
- a storage controller configured to cause the storage device to
  - store the first data in the nonvolatile memory device based on the first device logical address, and
  - store the second data in the nonvolatile memory device based on the second device logical address.

* * * * *